UNITED STATES PATENT OFFICE.

FRANK E. POULTON, OF BOSTON, MASSACHUSETTS, ASSIGNOR, BY MESNE ASSIGNMENTS, TO S. STERNAU & CO. INC., OF BROOKLYN, NEW YORK, A CORPORATION OF NEW YORK.

INFUSIBLE SOLIDIFIED LIQUID FUEL AND PROCESS OF MAKING THE SAME.

1,299,408.     Specification of Letters Patent.     Patented Apr. 1, 1919.

No Drawing.     Application filed April 16, 1915. Serial No. 21,874.

*To all whom it may concern:*

Be it known that I, FRANK E. POULTON, of Boston, in the county of Suffolk and State of Massachusetts, have invented a new and useful Infusible Solidified Liquid Fuel and Process of Making the Same, of which the following is a specification.

The main object of my invention is to provide a solid fuel which, while readily combustible, will not melt during its burning and in the preferred form my invention is embodied in a solidified alcohol which is infusible.

Attempts have heretofore been made to provide such an article but in such cases there has been during combustion melting to a liquid or partially-liquid state or there has been a large and offensive residue of a greasy nature both of which objections are overcome by my invention which in the preferred form consists in the combination of pyroxylin, ether and alcohol so treated as to be solid and readily combustible but lacking the liquescent quality above referred to.

The process I prefer is to use a pyroxylin compound much like photographic collodion consisting of one ounce of pyroxylin, thirty-six fluid ounces of ether and twelve fluid ounces of alcohol, preferably denatured alcohol, and this may be made in any suitable way such for example as adding the ether to the pyroxylin and letting them stand perhaps fifteen minutes and then adding the alcohol and shaking the mixture until the pyroxylin is dissolved. To fourteen fluid ounces of this mixture I add eighteen fluid ounces of alcohol, preferably denatured alcohol. This mixture is thoroughly stirred and poured in a cold condition into pans, preferably shallow to permit of ready removal. The pans are then placed over, or in adjacency to, a water bath which has been raised to a temperature of preferably 91 to 92 degrees Fahrenheit and so kept preferably from fifteen to eighteen minutes, said temperature preferably remaining constant. Under these conditions the ether boils and is gradually, but only partially, vaporized giving to the other elements a highly contractile quality. The pans are then taken away from the water bath and are covered and allowed to stand from nine to ten hours so that the mixture thoroughly solidifies. The proportions stated give a product having above one per cent. of pyroxylin when all the ether, except a trace, has been driven off. This is advantageous as assuring a product which will well retain the liquid combustible under the conditions of commercial handling and use.

The resultant article is a sheet of jelly like alcohol of pronounced solidity which is translucent because the alcohol has not boiled. The product is then preferably cut into tablets of convenient size which tablets when ignited burn readily and slowly without liquefying at all and leaving practically no residue whatever.

I find it advantageous to do my heating slowly to prevent a cloudy appearance of the completed product.

For some purposes the temperature may be other than above stated so long as it is above the boiling point of ether and below the boiling point of alcohol but I prefer the temperature stated.

If desired practically all the ether may be driven off in which case there results a pasty mass which is completely combustible and which will not liquefy.

My product may be ignited with perfect safety in the open or in a container and will never liquefy under any degree of heat. When ignited it gives a blue and orange flame of intense heat having no residue. It will burn safely on the tines of a fork or on a plate or elsewhere, burning slowly and quite dry from the moment of ignition to complete combustion. No matter how long the product may be burned if at any time during combustion the flame is extinguished the remaining portion will be practically cold immediately.

The action which takes place in the manufacture of my improved product may be described briefly as first forming a solution of pyroxylin and then diluting this solution so as to reduce the percentage of solvent, whereby the pyroxylin coagulates in the presence of the liquid fuel and the latter is thereby held by the coagulated pyroxylin. By the use of a volatile ingredient, such as ether, the reduction of the percentage of solvent due to dilution is aided by the evaporation of the volatile ingredient, which, as it evaporates, lowers the solvent power of the mixture, and the use of such a volatile ingredient is preferable. In the dilution of the mixture, the diluent action of the water contained in the alcohol is to be kept in mind. Where denatured alcohol is used, the wood alcohol and water contained therein are advantageous, the wood alcohol, aside from its solvent power, having a higher oxygen content than the grain alcohol, and therefore aiding combustion, while the water in the denatured alcohol assists in the dilution of the mixture, and the consequent coagulation of the pyroxylin.

The great advantage of my product as to convenience and perfect safety will be clear from the above description.

A great advantage of my product is that it is highly economical because when the flame is extinguished the remaining material will not evaporate if protected from the air but will be ready for use when again ignited.

What I claim is:

1. As an article of manufacture, a solid, inflammable and infusible alcohol fuel.

2. A solid infusible fuel comprising pyroxylin, ether and alcohol.

3. A solid infusible, slowly-inflammable and completely combustible fuel comprising pyroxylin and alcohol.

4. As an article of manufacture, a solid infusible alcohol fuel of uniform consistency and free from lumps.

5. As an article of manufacture, a solid infusible fuel comprising an alcohol and colloidal pyroxylin, the pyroxylin being in sufficient quantity to retain the alcohol under normal conditions of commercial handling and use.

6. As an article of manufacture, a solid infusible fuel comprising an alcohol retained in colloidal pyroxylin, the pyroxylin amounting to not less than one per cent. of the fuel.

7. As an article of manufacture, a solid infusible fuel comprising a liquid combustible retained in a pyroxylin compound, the said pyroxylin amounting to not less than one per cent. of the fuel, whereby the liquid combustible is held by the pyroxylin compound under normal conditions of commercial handling and use.

8. As an article of manufacture, a solid infusible fuel comprising an alcohol and a highly combustible solidifying agent.

9. The process of making an alcohol fuel, which comprises dissolving pyroxylin to form a solution, combining an alcohol therewith, and solidifying the pyroxylin and retaining the alcohol in such proportions as to form a solid infusible alcohol fuel.

10. The process of making an alcohol fuel, which consists in quickly evaporating off a portion of the ether from a mixture of pyroxylin, ether and alcohol, and then allowing the remainder of the mixture to solidify slowly.

11. The process of making an infusible solid alcohol fuel which consists in combining alcohol and a solution of pyroxylin which contains ether, and subjecting the mixture to evaporating conditions until it solidifies, while protecting it from the atmosphere.

12. The process of making an infusible solid alcohol fuel consisting in mixing one ounce of pyroxylin and thirty-six fluid ounces of ether, letting the mixture stand, then adding twelve fluid ounces of alcohol and shaking until the pyroxylin is dissolved, then adding to fourteen ounces of the mixture eighteen fluid ounces of alcohol, then stirring, then heating at about 91 degrees Fahrenheit for about fifteen minutes, driving off a portion of the ether, then allowing the remainder to cool for about nine hours so as to become solid.

13. The process of making an infusible solid alcohol fuel consisting in adding to fourteen ounces of the pyroxylin compound of substantially the composition described eighteen ounces of alcohol, then heating at about 91 degrees Fahrenheit for about fifteen minutes, driving off part of the ether, and then allowing the remainder to cool for about nine hours so as to become solid.

14. The process of making an infusible solid alcohol fuel consisting in adding to about fourteen ounces of the pyroxylin compound of substantially the composition described eighteen ounces of alcohol, then eliminating part of the ether and then allowing the remainder to stand until it becomes solid.

15. The process of making an infusible solid alcohol fuel, consisting in adding to about fourteen ounces of the pyroxylin compound of substantially the composition described eighteen ounces of alcohol, then eliminating part of the ether and then allowing the remainder to stand protected from the atmosphere until it becomes solid.

FRANK E. POULTON.